US012718773B2

(12) United States Patent
Park

(10) Patent No.: US 12,718,773 B2
(45) Date of Patent: Aug. 25, 2026

(54) DISPLAY DEVICE

(71) Applicant: LG Display Co., Ltd., Seoul (KR)

(72) Inventor: Taehwa Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/275,195

(22) Filed: Jul. 21, 2025

(65) Prior Publication Data

US 2026/0148701 A1 May 28, 2026

(30) Foreign Application Priority Data

Nov. 28, 2024 (KR) ........................ 10-2024-0173567

(51) Int. Cl.
*G09G 3/3291* (2016.01)
*G09G 3/36* (2006.01)

(52) U.S. Cl.
CPC ......... *G09G 3/3291* (2013.01); *G09G 3/3688* (2013.01); *G09G 2300/0814* (2013.01); *G09G 2320/0285* (2013.01); *G09G 2330/023* (2013.01); *G09G 2330/028* (2013.01)

(58) Field of Classification Search
None
See application file for complete search history.

(56) References Cited

U.S. PATENT DOCUMENTS

| | | | | |
|---|---|---|---|---|
| 10,657,878 | B2 | 5/2020 | Nam et al. | |
| 11,049,459 | B2 | 6/2021 | Kim | |
| 2016/0189623 | A1* | 6/2016 | Miwa | G09G 3/3233 345/212 |
| 2020/0184902 | A1* | 6/2020 | Kim | G09G 3/3291 |
| 2021/0043149 | A1* | 2/2021 | Yoo | G09G 3/3291 |

FOREIGN PATENT DOCUMENTS

| | | | |
|---|---|---|---|
| KR | 102578707 | B1 | 9/2023 |
| KR | 102607397 | B1 | 11/2023 |
| KR | 102625945 | B1 | 1/2024 |

* cited by examiner

*Primary Examiner* — Stephen T. Reed
(74) *Attorney, Agent, or Firm* — Seed Intellectual Property Law Group LLP

(57) ABSTRACT

The embodiments of the present disclosure relate to a display device, and more specifically, to a display device comprising: a display panel in which a plurality of sub-pixels are disposed; a data driver circuit that applies a plurality of data voltages to the plurality of sub-pixels through a plurality of data lines; a driving voltage supply circuit that supplies a driving voltage to the display panel; and a power management circuit that receives a feedback driving voltage from the display panel, receives the driving voltage output from the driving voltage supply circuit, and outputs a gamma reference voltage to the data driver circuit. The power management circuit includes a register that stores data related to variation in the driving voltage. The gamma reference voltage is variable according to the feedback driving voltage. As a result, a gamma reference voltage that is not affected by noise can be generated.

15 Claims, 12 Drawing Sheets

| GRAY | VDDFB | VDD-VDDFB(DATA) | | | | | | | |
|---|---|---|---|---|---|---|---|---|---|
| | | 0BIT | 1BIT | 2BIT | 3BIT | 4BIT | 5BIT | 6BIT | 7BIT |
| 0 | MAX | 0 | 0 | 0 | 0 | 0 | 0 | 0 | 0 |
| | | | | | | | | | |
| | | | | ... | | | | | |
| | | | | | | | | | |
| 255 | MIN | 0 | 0 | 1 | 1 | 0 | 0 | 0 | 0 |

FIG.8

DISPLAY DEVICE

CROSS-REFERENCE TO RELATED APPLICATION

This application claims priority from Korean Patent Application No. 10-2024-0173567, filed on Nov. 28, 2024, which is hereby incorporated by reference for all purposes as if fully set forth herein.

BACKGROUND

Technical Field

Embodiments of the present disclosure relate to a display device.

Description of the Related Art

With the advancement of the information society, demand for display devices capable of displaying images has been increasing in various forms. Recently, various types of display devices, such as liquid crystal display (LCD) devices and organic light-emitting display (OLED) devices, have been widely used.

BRIEF SUMMARY

In display devices, the gamma reference voltage is adjusted using an analog driving voltage. Accordingly, noise due to the analog driving voltage may be reflected in the gamma reference voltage. As a result of such noise, unintended lines unrelated to image content may appear in part of the display region. Embodiments of the present disclosure may provide a display device capable of adjusting the driving voltage using a digital driving voltage.

Embodiments of the present disclosure may provide a display device that adjusts a gamma reference voltage using a feedback driving voltage.

Embodiments of the present disclosure may provide a display device including a lookup table for adjusting a gamma reference voltage.

Embodiments of the present disclosure may provide a display device including: a display panel in which a plurality of sub-pixels are disposed; a data driver circuit that applies a plurality of data voltages to the plurality of sub-pixels through a plurality of data lines; a driving voltage supply circuit that supplies a driving voltage to the display panel; and a power management circuit that receives a feedback driving voltage from the display panel, receives the driving voltage output from the driving voltage supply circuit, and outputs a gamma reference voltage to the data driver circuit. The power management circuit includes a register that stores data related to variation in the driving voltage. The gamma reference voltage is variable according to the feedback driving voltage.

Embodiments of the present disclosure may provide a display device including: a display panel in which a plurality of sub-pixels are disposed; a data driver circuit that applies a plurality of data voltages to the plurality of sub-pixels through a plurality of data lines; a driving voltage supply circuit that supplies a driving voltage to the display panel; and a power management circuit that receives a plurality of feedback driving voltages from the display panel and receives the driving voltage output from the driving voltage supply circuit. The power management circuit includes a register that stores data variable according to the plurality of feedback driving voltages and the driving voltage.

According to embodiments of the present disclosure, it is possible to provide a display device including a power management circuit that adjusts a gamma reference voltage based on a value of a received feedback driving voltage.

According to embodiments of the present disclosure, it is possible to provide a display device including a register that stores data variable according to the feedback driving voltage and the driving voltage.

According to embodiments of the present disclosure, it is possible to provide a display device including a register that changes stored data in response to variation in the feedback driving voltage input to the power management circuit.

According to embodiments of the present disclosure, it is possible to provide a lightweight display device that does not require a filter for removing noise of an analog voltage.

BRIEF DESCRIPTION OF THE SEVERAL VIEWS OF THE DRAWINGS

FIG. 8 is a diagram illustrating a lookup table of a display device according to embodiments of the present disclosure.

DETAILED DESCRIPTION

Figure 1:
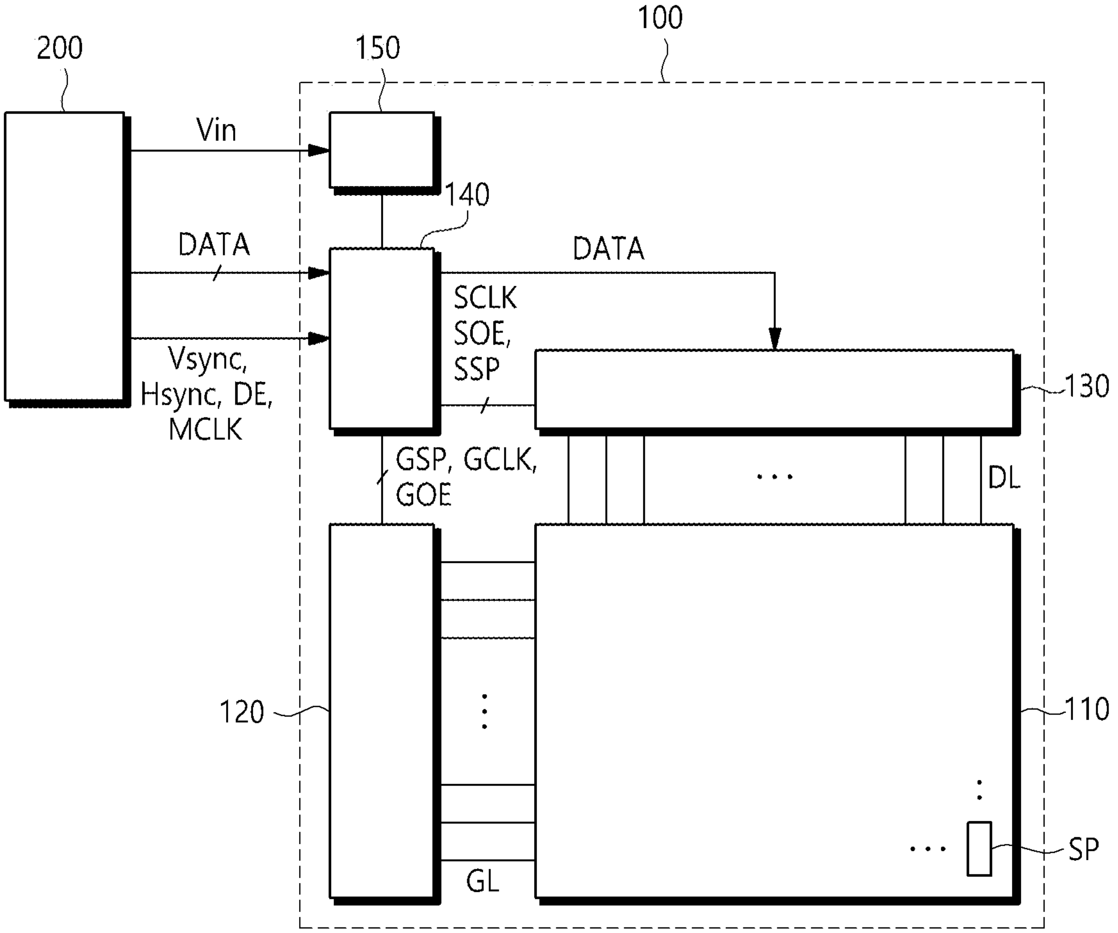
FIG. 1 is a system configuration diagram of a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the detailed description thereof may make the subject matter in some embodiments of the present disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the present disclosure. Each of these terms is not used to define essence, order, sequence, or number of elements, etc., but is used merely to distinguish the corresponding element from other elements.

When it is mentioned that a first element “is connected or coupled to”, “contacts or overlaps”, etc., a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc., each other via a fourth element. Here, the second element may be included in at least one of two or more elements that “are connected or coupled to”, “contact or overlap”, etc., each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term “may” fully encompasses all the meanings of the term “can”.

Various embodiments of the present disclosure will be described in detail with reference to the accompanying drawings.

FIG. 1 is a system configuration diagram of the display device 100 according to embodiments of the present disclosure.

Referring to FIG. 1, the display device 100 according to an embodiment of the present disclosure may include a display panel 110 in which a plurality of gate lines GL and a plurality of data lines DL are connected and a plurality of sub-pixels SP are arranged in a matrix form; a gate driver circuit 120 that drives the plurality of gate lines GL; a data driver circuit 130 that supplies data voltages through the plurality of data lines DL; a controller 140 that controls the gate driver circuit 120 and the data driver circuit 130; and a power management circuit 150.

The display panel 110 displays images based on scan signals transmitted from the gate driver circuit 120 through the plurality of gate lines GL and data voltages transmitted from the data driver circuit 130 through the plurality of data lines DL.

In the case of a liquid crystal display, the display panel 110 includes a liquid crystal layer formed between two substrates, and may operate in any known mode, such as a Twisted Nematic TN mode, Vertical Alignment VA mode, In-Plane Switching IPS mode, or Fringe Field Switching FFS mode. In contrast, in the case of an organic light-emitting display, the display panel 110 may be implemented using a top emission type, a bottom emission type, or a dual emission type.

The display panel 110 may include a plurality of pixels arranged in a matrix form. Each pixel may include sub-pixels SP of different colors, for example, white, red, green, and blue sub-pixels. Each sub-pixel SP may be defined by the plurality of data lines DL and the plurality of gate lines GL.

Each sub-pixel SP may include a thin film transistor TFT formed at the intersection of a data line DL and a gate line GL; a light-emitting device, such as an organic light-emitting diode OLED, that receives a data voltage; and a storage capacitor that is electrically connected to the light-emitting device for maintaining a voltage.

For example, when the display device 100 has a resolution of 2,160×3,840 and includes four sub-pixels SP—white W, red R, green G, and blue B—a total of 15,360 data lines DL may be provided, each connected to the 3,840 columns×4 sub-pixels. The sub-pixels SP are arranged at points where the 2,160 gate lines GL and the 15,360 data lines DL intersect.

The gate driver circuit 120 is controlled by the controller 140 and sequentially outputs scan signals to the plurality of gate lines GL disposed in the display panel 110 to control the driving timing of the sub-pixels SP.

In the display device 100 with a resolution of 2,160×3,840, when scan signals are sequentially output from the first to the 2,160th gate line GL, this is referred to as 2,160-phase driving. Alternatively, when scan signals are sequentially output in units of four gate lines—for example, from the first to the fourth, then from the fifth to the eighth—this is referred to as 4-phase driving. More generally, when scan signals are sequentially output in units of N gate lines, this is referred to as N-phase driving.

The gate driver circuit 120 may include one or more gate driving integrated circuits GDICs. Depending on the driving method, the gate driver circuit 120 may be located on one side or both sides of the display panel 110. Alternatively, the gate driver circuit 120 may be embedded in a bezel region of the display panel 110 and implemented as a gate-in-panel GIP structure.

The data driver circuit 130 receives image data DATA from the controller 140 and converts the received image data into analog data voltages. Then, in synchronization with scan signals applied through the gate lines GL, the data voltages are output to the corresponding data lines DL, so that each sub-pixel SP connected to a data line DL emits light at a brightness corresponding to the data voltage.

Similarly, the data driver circuit 130 may include one or more source driving integrated circuits (SDICs). Each SDIC may be connected to a bonding pad of the display panel 110 using a tape automated bonding (TAB) method or a chip-on-glass (COG) method, or directly mounted on the display panel 110.

In some cases, the SDICs may be integrated into the display panel 110. Additionally, the SDICs may be implemented using a chip-on-film (COF) method, in which the SDICs are mounted on a circuit film and electrically connected to the data lines DL of the display panel 110 through the circuit film.

The controller 140 supplies various control signals to the gate driver circuit 120 and the data driver circuit 130, and controls their operation. Specifically, the controller 140 controls the gate driver circuit 120 to output scan signals in accordance with the timing of each frame, while transmitting image data DATA received from an external source to the data driver circuit 130.

The controller 140 receives various timing signals from an external host system 200, including vertical sync (Vsync), horizontal sync (Hsync), data enable (DE), and a main clock (MCLK), along with the image data DATA.

The host system 200 may be a television (TV) system, set-top box, navigation system, personal computer (PC), home theater system, mobile device, or wearable device.

Accordingly, the controller 140 generates control signals using the timing signals received from the host system 200, and supplies the control signals to the gate driver circuit 120 and the data driver circuit 130.

For example, to control the gate driver circuit 120, the controller 140 outputs various gate control signals including a gate start pulse GSP, a gate clock GCLK, and a gate output enable signal GOE. The gate start pulse GSP controls the timing at which one or more gate driving integrated circuits GDICs of the gate driver circuit 120 start operating. The GCLK is a clock signal commonly input to the GDICs and controls the shift timing of scan signals. The GOE specifies timing information for one or more GDICs.

Similarly, to control the data driver circuit 130, the controller 140 outputs various data control signals including a source start pulse SSP, a source sampling clock SCLK, and a source output enable signal SOE. The source start pulse SSP controls the timing at which one or more source driving integrated circuits SDICs, which constitute the data driver circuit 130, start sampling data. The SCLK is a clock signal that controls the timing for sampling data in the SDICs. The SOE controls the output timing of the data driver circuit 130.

The display device 100 may further include the power management circuit 150 that supplies various voltages or currents to the display panel 110, the gate driver circuit 120, and the data driver circuit 130, or controls such voltages or currents to be supplied.

The power management circuit 150 adjusts a direct current input voltage Vin supplied from the host system 200 to generate power needed to drive the display panel 110, the gate driver circuit 120, and the data driver circuit 130.

Meanwhile, each sub-pixel SP is located at a point where the gate line GL and the data line DL intersect, and may include a light-emitting device. For example, in an organic light-emitting display, each sub-pixel SP may include a light-emitting device such as an OLED, and display an image by controlling a current flowing through the light-emitting device based on the data voltage.

The display device 100 may be implemented as a variety of types of display devices, including a liquid crystal display (LCD), an organic light-emitting display (OLED), or a plasma display panel (PDP).

Figure 2:
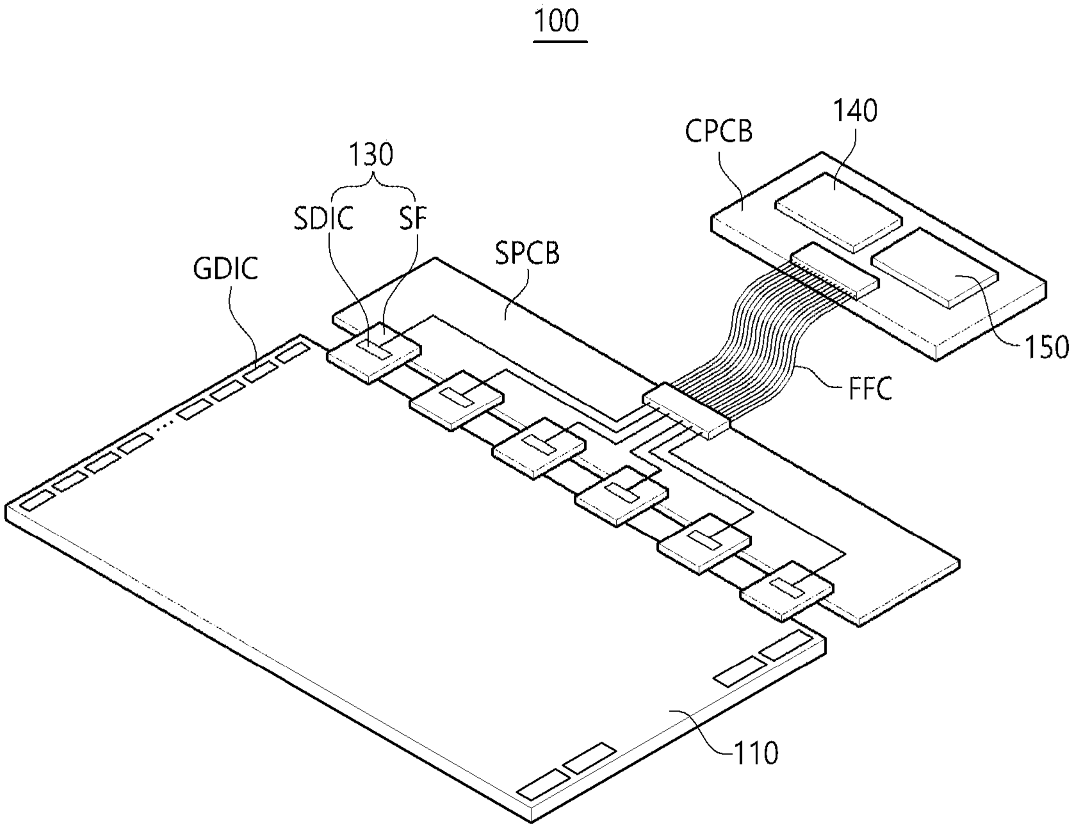
FIG. 2 is a system example diagram of a display device according to embodiments of the present disclosure.

FIG. 2 is a system example diagram of the display device 100 according to embodiments of the present disclosure.

Referring to FIG. 2, FIG. 2 illustrates a case where the data driver circuit 130 is implemented using a chip-on-film (COF) method among various packaging methods (e.g., TAB, COG, COF), and the gate driver circuit 120 is implemented as a gate-in-panel (GIP) structure among various packaging methods (e.g., TAB, COG, COF, GIP).

When the gate driver circuit 120 is implemented in the form of a gate-in-panel (GIP) structure, a plurality of gate driving integrated circuits (GDICs) included in the gate driver circuit 120 may be directly formed in a bezel region of the display panel 110. In this case, the GDICs may receive various signals necessary for generating scan signals, such as a clock signal, a gate high signal, and a gate low signal, through gate driving-related signal lines arranged in the bezel region.

Similarly, one or more source driving integrated circuits (SDICs) included in the data driver circuit 130 may be mounted on respective source films SF, and one side of each source film SF may be electrically connected to the display panel 110. In addition, on the upper portion of each source film SF, wirings for electrically connecting the SDICs to the display panel 110 may be arranged.

The display device 100 may include at least one source printed circuit board (SPCB) for establishing circuit-level connections between the plurality of SDICs and other devices, and a control printed circuit board (CPCB) for mounting control components and various electrical devices.

At least one source printed circuit board (SPCB) may be connected to the a side of the source film SF on which the SDIC is mounted. In other words, the source film SF on which the SDIC is mounted may be electrically connected at one side to the display panel 110 and at the other side to the SPCB.

The control printed circuit board (CPCB) may have the controller 140 and the power management circuit 150 mounted thereon. The controller 140 may control operations of the data driver circuit 130 and the gate driver circuit 120. The power management circuit 150 may supply driving voltages or currents to the display panel 110, the data driver circuit 130, and the gate driver circuit 120, or may control the voltages or currents being supplied.

At least one SPCB and the CPCB may be electrically connected through at least one connection member, and the connection member may include, for example, a flexible printed circuit (FPC) or a flexible flat cable (FFC). Additionally, at least one SPCB and the CPCB may be integrated into a single printed circuit board.

In this case, each sub-pixel SP arranged in the display panel 110 of the display device 100 may include a light-emitting device and circuit elements such as a driving transistor for driving the light-emitting device.

The types and number of circuit elements forming each sub-pixel SP may vary depending on functions provided and design approaches.

Figure 3:
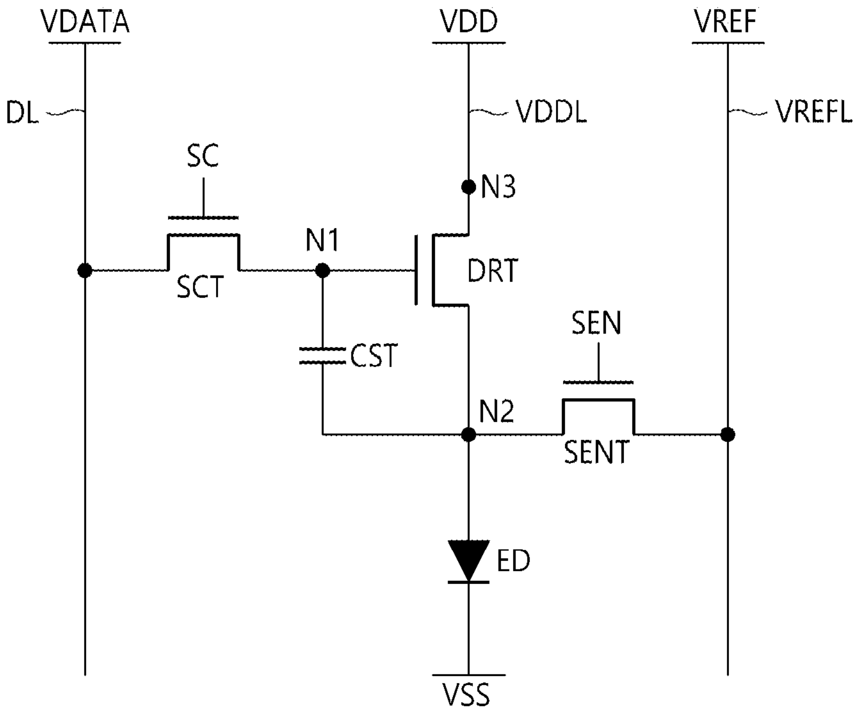
FIG. 3 is a circuit diagram illustrating a sub-pixel of a display device according to embodiments of the present disclosure.

FIG. 3 is a diagram illustrating an example of a sub-pixel SP circuit of the display device 100 according to embodiments of the present disclosure.

Referring to FIG. 3, in the display device 100 according to an embodiment of the present disclosure, the sub-pixel SP may include one or more transistors and a capacitor, and an organic light-emitting diode may be arranged as a light-emitting device ED.

For example, the sub-pixel SP may include a driving transistor DRT, a switching transistor SCT, a sensing transistor SENT, a storage capacitor CST, and the light-emitting device ED.

The driving transistor DRT has a first node N1, a second node N2, and a third node N3. The first node N1 of the driving transistor DRT may serve as a gate node to which a data voltage VDATA is applied from the data driver circuit 130 through the data line DL when the switching transistor SCT is turned on. The second node N2 of the driving transistor DRT may be electrically connected to the anode electrode of the light-emitting device ED, and may serve as a source node or a drain node. The third node N3 of the driving transistor DRT may be electrically connected to a driving voltage line VDDL to which a driving voltage VDD is applied, and may serve as a drain node or a source node.

During a display driving period, the driving voltage VDD required to display an image may be supplied through the driving voltage line VDDL. For example, the sub-pixel driving voltage VDD required for displaying an image may be 27 V.

The switching transistor SCT is electrically connected between the first node N1 of the driving transistor DRT and the data line DL, and its gate node is connected to a gate line GL so that it operates in response to a scan signal SC supplied through the gate line GL. When the switching transistor SCT is turned on, the data voltage VDATA supplied through the data line DL is delivered to the gate node of the driving transistor DRT, thereby controlling the operation of the driving transistor DRT.

The sensing transistor SENT is electrically connected between the second node N2 of the driving transistor DRT and a reference voltage line VREFL. The gate line GL is connected to a gate node and operates in response to a sensing signal SEN supplied through the gate line GL. When the sensing transistor SENT is turned on, a sensing reference voltage VREF supplied through the reference voltage line VREFL is applied to the second node N2 of the driving transistor DRT.

That is, by controlling the switching transistor SCT and the sensing transistor SENT, the voltages at the first node N1 and the second node N2 of the driving transistor DRT are controlled, so that a current for driving the light-emitting device ED may be supplied.

The gate nodes of the switching transistor SCT and the sensing transistor SENT may be connected to the same gate line GL, or may be connected to different gate lines GL. Here, an example is illustrated in which the switching transistor SCT and the sensing transistor SENT are connected to different gate lines GL, so that the switching transistor SCT and the sensing transistor SENT can be independently controlled by a scan signal SC and a sensing signal SEN delivered through different gate lines GL.

On the other hand, when the switching transistor SCT and the sensing transistor SENT are connected to the same gate line GL, they may be controlled simultaneously by either the scan signal SC or the sensing signal SEN delivered through the same gate line GL, which may increase the aperture ratio of the sub-pixel SP.

Meanwhile, the transistors arranged in the sub-pixel SP may be formed not only with n-type transistors but also with p-type transistors. Here, an example is illustrated in which the transistors are formed of n-type transistors.

The storage capacitor CST is electrically connected between the first node N1 and the second node N2 of the driving transistor DRT, and maintains the data voltage VDATA during one frame period.

This storage capacitor CST may be connected between the first node N1 and the third node N3 of the driving transistor DRT, depending on the type of the driving transistor DRT. The anode electrode of the light-emitting device ED may be electrically connected to the second node N2 of the driving transistor DRT, and a base voltage VSS may be applied to the cathode electrode of the light-emitting device ED.

Here, the base voltage VSS may be a ground voltage, or a voltage higher or lower than the ground voltage. In addition, the base voltage VSS may be variable depending on the driving state. For example, the base voltage VSS at a display driving time and the base voltage VSS at a sensing driving time may be differently set.

The above-described structure of the sub-pixel SP is an example based on a 3-transistor 1-capacitor (3T1C) configuration for illustrative purposes, and may include one or more additional transistors or, in some cases, one or more additional capacitors. Alternatively, each of a plurality of sub-pixels SP may have the same structure, or some of the sub-pixels SP may have different structures.

The display device 100 according to an embodiment of the present disclosure may use a method of measuring a current flowing due to a voltage charged in the storage capacitor CST during a characteristic sensing period of the driving transistor DRT, in order to effectively sense characteristic values of the driving transistor DRT, such as threshold voltage or mobility. This method is referred to as current sensing.

That is, by measuring a current flowing due to the voltage charged in the storage capacitor CST during the characteristic value sensing period of the driving transistor DRT, it is possible to determine the characteristic value or a change in the characteristic value of the driving transistor DRT within the sub-pixel SP.

In this case, the reference voltage line VREFL not only serves to deliver the reference voltage VREF, but also functions as a sensing line for sensing the characteristic value of the driving transistor DRT within the sub-pixel SP. Accordingly, the reference voltage line VREFL may be referred to as a sensing line.

Figure 4:
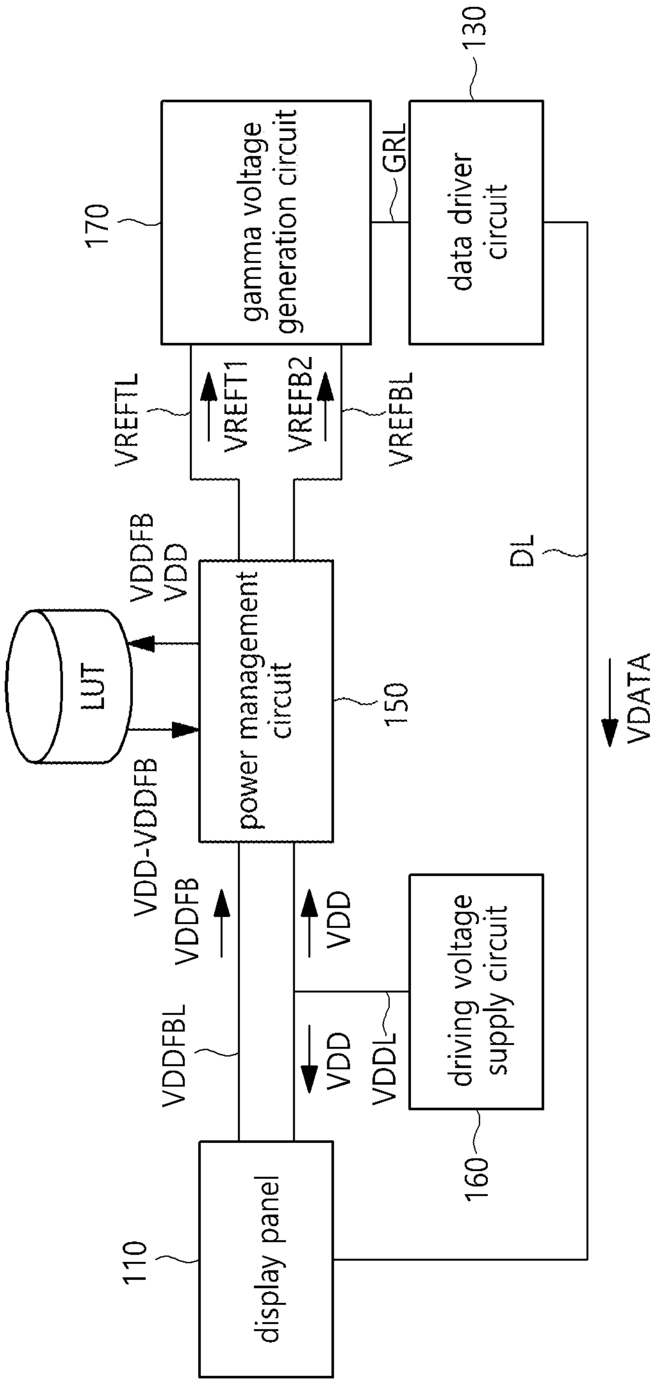
FIG. 4 is a configuration diagram illustrating an example of adjusting a gamma reference voltage using a feedback driving voltage and a driving voltage in a display device according to embodiments of the present disclosure.

FIG. 4 is a block diagram illustrating an example in which a gamma reference voltage is changed using a feedback driving voltage VDDFB and a driving voltage VDD in the display device 100 according to embodiments of the present disclosure.

The display device 100 may include a display panel 110, a power management circuit 150, a gamma voltage generation circuit 170, a data driver circuit 130, and a driving voltage supply circuit 160.

The display panel 110 may be electrically connected to the power management circuit 150 through a feedback driving voltage line VDDFBL. The display panel 110 may be electrically connected to the driving voltage supply circuit 160 through a driving voltage line VDDL.

The driving voltage supply circuit 160 may be electrically connected to the power management circuit 150 through the driving voltage line VDDL. According to embodiments, the driving voltage supply circuit 160 may be implemented within the power management circuit 150.

The power management circuit 150 may include a lookup table LUT. The power management circuit 150 may obtain a difference value between the driving voltage VDD and the feedback driving voltage VDDFB using the lookup table LUT. The power management circuit 150 may generate the gamma reference voltage (e.g., a first gamma reference voltage VREFT1 and a second gamma reference voltage VREFB2) based on the difference value between the driving voltage VDD and the feedback driving voltage VDDFB. Accordingly, the power management circuit 150 may generate the gamma reference voltage that reflects the voltage drop of the driving voltage VDD.

The power management circuit 150 may be connected to the gamma voltage generation circuit 170 through the gamma reference voltage line. The gamma reference voltage line may include a first gamma reference voltage line VREFTL and a second gamma reference voltage line VREFBL. The first gamma reference voltage VREFT1 and the second gamma reference voltage VREFB2 may be respectively input to the first gamma reference voltage line VREFTL and the second gamma reference voltage line VREFBL. The voltage level of the first gamma reference voltage VREFT1 may be higher than that of the second gamma reference voltage VREFB2.

The gamma voltage generation circuit 170 may be connected to the data driver circuit 130 through the gamma reference voltage supply line GRL. The gamma reference voltage for generating a data voltage VDATA may be applied to the gamma reference voltage supply line GRL.

The data driver circuit 130 may generate the data voltage VDATA using the gamma reference voltage. The data driver circuit 130 may supply the data voltage VDATA to the display panel 110 through the data lines DL.

The display panel 110 may display an image by supplying the data voltage VDATA to the sub-pixels SP.

Hereinafter, an example operation in which the gamma voltage generation circuit 170 generates the gamma reference voltage will be described.

Figure 5:
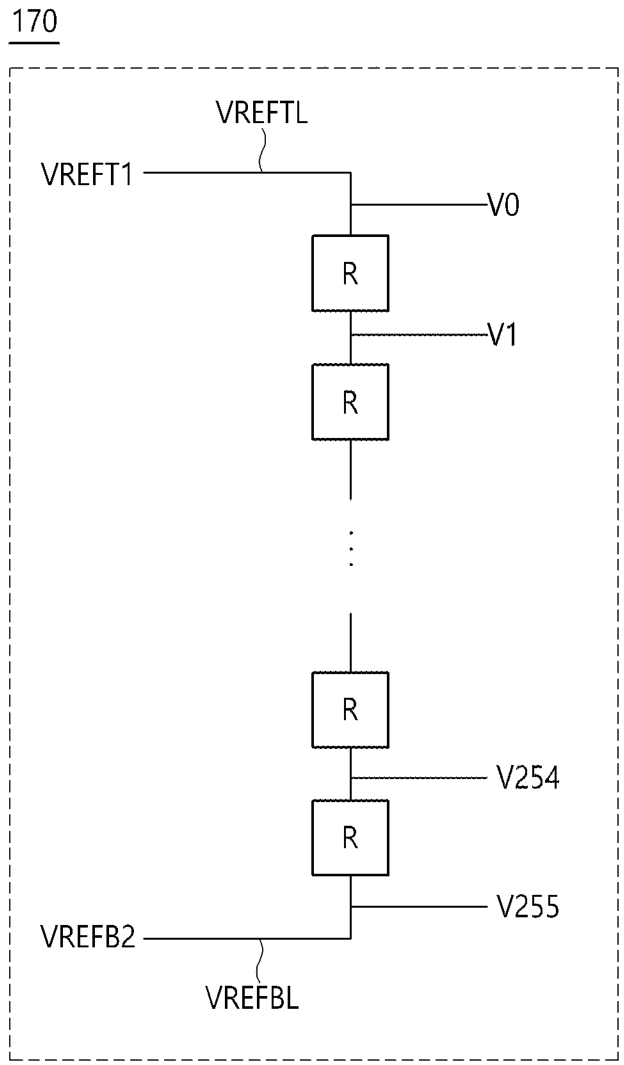
FIG. 5 is a diagram illustrating a gamma voltage generation circuit of a display device according to embodiments of the present disclosure.

FIG. 5 is a diagram illustrating the gamma voltage generation circuit 170 of the display device 100 according to embodiments of the present disclosure.

Referring to FIG. 5, the gamma voltage generation circuit 170 may include a first gamma reference voltage line VREFLT to which the first gamma reference voltage VREFT1 is input, a second gamma reference voltage line VREFLBL to which the second gamma reference voltage VREFB2 is input, and a plurality of resistor strings R for dividing the first and second gamma reference voltages VREFT1 and VREFB2.

The first gamma reference voltage VREFT1 may be a 0-level gamma voltage applied to the upper end of the resistor string R, and the second gamma reference voltage VREFB2 may be a 255-level gamma voltage applied to the lower end of the resistor string R.

Accordingly, the gamma voltage generation circuit 170 may output gamma voltages representing a plurality of gray levels (e.g., gray levels 0, 1, 3, 15, 31, 63, 127, 191, and 255) by dividing the first and second gamma reference voltages VREFT1 and VREFB2 through the resistor string R. For example, the gamma voltage corresponding to gray level 0 may be output as a first voltage V0, that corresponding to gray level 1 as a second voltage V2, that corresponding to gray level 254 as a third voltage V254, and that corresponding to gray level 255 as a fourth voltage V255.

Figure 6:
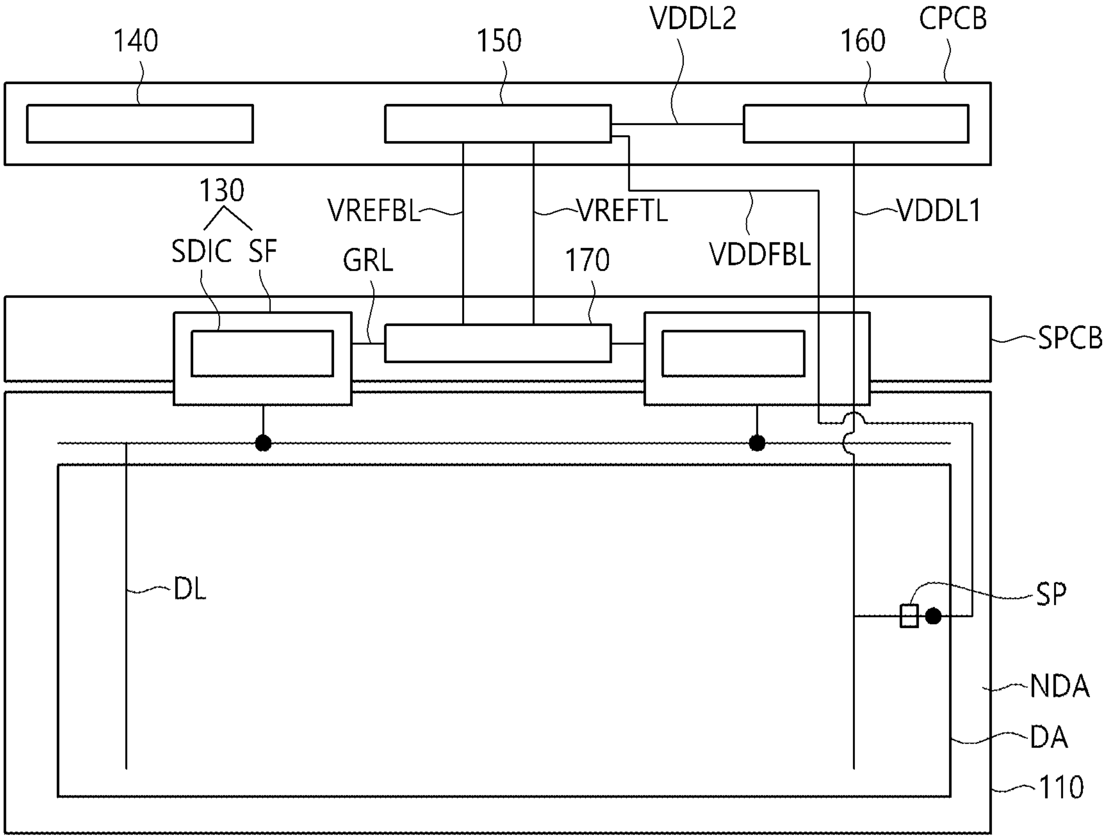
FIG. 6 is a diagram illustrating a layout structure of a plurality of lines in a display device according to embodiments of the present disclosure.

FIG. 6 is a diagram illustrating a layout structure of a plurality of lines in the display device 100 according to embodiments of the present disclosure.

Referring to FIG. 6, the control printed circuit board (CPCB) may have the controller 140, the power management circuit 150, and the driving voltage supply circuit 160 mounted thereon. According to an embodiment, the driving voltage supply circuit 160 may be included in the power management circuit 150.

The source printed circuit board (SPCB) may have the source film SF, the data driver circuit 130, which includes the source driving integrated circuit SDIC, and the gamma voltage generation circuit 170 mounted thereon. The gamma voltage generation circuit 170 may be disposed on the source printed circuit board SPCB separately from the data driver circuit 130, or may be included in the data driver circuit 130.

The power management circuit 150 and the driving voltage supply circuit 160 may be electrically connected through a second driving voltage line VDDL2. The power management circuit 150 may be connected to the gamma voltage generation circuit 170 through a first gamma reference voltage line VREFTL and a second gamma reference voltage line VREFBL. The power management circuit 150 may be connected to the display panel 110 through a feedback driving voltage line VDDFBL.

The driving voltage supply circuit 160 may be connected to the display panel 110 through a first driving voltage line VDDL1. At least a portion of the first driving voltage line VDDL1 may be disposed on the source film SF. The first driving voltage line VDDL1 may be connected to the display panel 110 via the source film SF.

The feedback driving voltage line VDDFBL may be connected to sub-pixels SP disposed at the outermost edge of the display panel 110. The connection point to the sub-pixels SP may be located in a display area DA or a non-display area NDA. At least a portion of the feedback driving voltage line VDDFBL may be disposed on the source film SF.

For example, the feedback driving voltage line VDDFBL may be composed of a plurality of lines. The feedback driving voltage lines VDDFBL may be respectively connected to a leftmost sub-pixel SP and a rightmost sub-pixel SP in the display panel 110. The connected feedback driving voltage lines VDDFBL may be electrically connected to the power management circuit 150.

The gamma voltage generation circuit 170 may be connected to the data driver circuit 130 through the gamma reference voltage supply line GRL.

The data driver circuit 130 may generate a data voltage VDATA according to the gamma reference voltage, and may supply the data voltage VDATA to the display panel 110 through the data lines DL.

The source film SF and the source driving integrated circuit SDIC disposed on the source printed circuit board (SPCB) are illustrated in the description of FIG. 2, and thus redundant description may be omitted.

Figure 7:
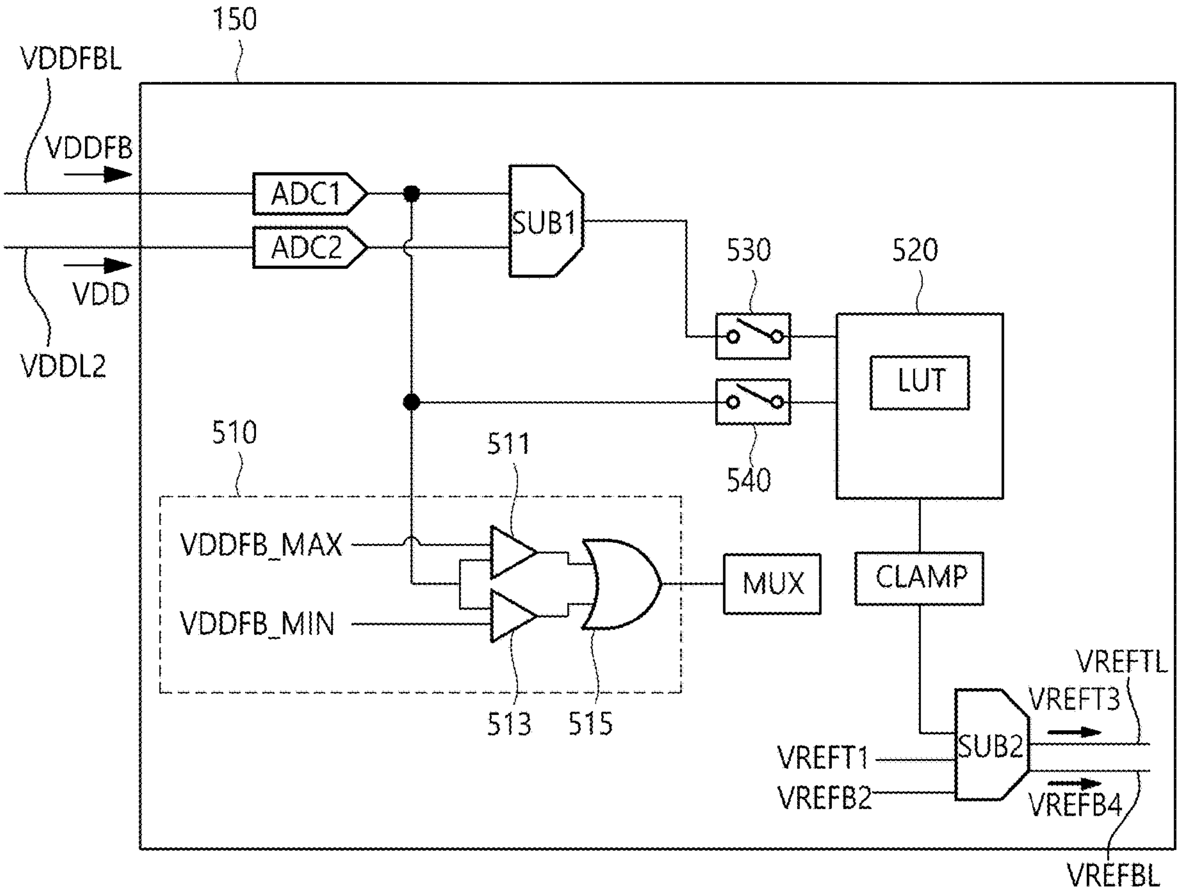
FIG. 7 is a diagram illustrating a power management circuit of a display device according to embodiments of the present disclosure.

FIG. 7 is a diagram of the power management circuit 150 of the display device 100 according to embodiments of the present disclosure.

Referring to FIG. 7, the power management circuit 150 may include a first analog-to-digital converter ADC1, a second analog-to-digital converter ADC2, a first subtractor circuit SUB1, a re-addressing circuit 510, a register 520, a first switch 530, a second switch 540, a selector circuit MUX, a limiter circuit CLAMP, and a second subtractor circuit SUB2.

The re-addressing circuit 510 may include a first comparator circuit 511, a second comparator circuit 513, and an OR circuit 515. The register 520 may include data in the form of a lookup table LUT.

The first analog-to-digital converter ADC1 may be connected to the feedback driving voltage line VDDFBL. The second analog-to-digital converter ADC2 may be connected to the driving voltage line VDDL2. The first analog-to-digital converter ADC1 and the second analog-to-digital converter ADC2 may be connected to the first subtractor circuit SUB1.

The first subtractor circuit SUB1 may be connected to the first switch 530. The first analog-to-digital converter ADC1 may be connected to the second switch 540. The first switch 530 and the second switch 540 may be connected to the register 520. The register 520 may be connected to the limiter circuit CLAMP. The limiter circuit CLAMP may be connected to the second subtractor circuit SUB2. The second subtractor circuit SUB2 may be connected to the first gamma reference voltage line VREFTL and the second gamma reference voltage line VREFBL.

The first analog-to-digital converter ADC1 may be connected to the re-addressing circuit 510. The first analog-to-digital converter ADC1 may be connected to the first comparator circuit 511 and the second comparator circuit 513. The first comparator circuit 511 and the second comparator circuit 513 may be connected to the OR circuit 515. The OR circuit 515 may be connected to the selector circuit MUX. The selector circuit MUX may be connected to the controller 140, or may receive a selection signal from the controller 140.

The first analog-to-digital converter ADC1 may convert the analog feedback driving voltage VDDFB received from the feedback driving voltage line VDDFBL into a digital form. The second analog-to-digital converter ADC2 may convert the analog driving voltage VDD received from the driving voltage line VDDL2 into a digital form.

The first analog-to-digital converter ADC1 may output the converted digital feedback driving voltage VDDFB to the first subtractor circuit SUB1, the second switch 540, and the re-addressing circuit 510. The second analog-to-digital converter ADC2 may output the converted digital driving voltage VDD to the first subtractor circuit SUB1.

By converting the driving voltage VDD and the feedback driving voltage VDDFB into digital form, noise that occurs in the driving voltage VDD of the analog-form or the feedback driving voltage VDDFB may not be reflected in the adjustment of the gamma reference voltage. As the driving voltage VDD and the feedback driving voltage VDDFB of the analog-form are converted into digital form, a filter that is typically disposed in the display device 100 to remove noise from the driving voltage VDD or the feedback driving voltage VDDFB may be omitted.

The first subtractor circuit SUB1 may subtract the value of the feedback driving voltage VDDFB from the value of the driving voltage VDD. By performing this subtraction, the first subtractor circuit SUB1 may calculate a difference value between the driving voltage VDD and the feedback driving voltage VDDFB. The first subtractor circuit SUB1 may output the difference value between the driving voltage VDD and the feedback driving voltage VDDFB to the first switch 530 and the register 520.

The first comparator circuit 511 may compare the input feedback driving voltage VDDFB with a maximum feedback driving voltage VDDFB_MAX. The second comparator circuit 513 may compare the input feedback driving voltage VDDFB with a minimum feedback driving voltage VDDFB_MIN.

The first comparator circuit 511 may output a low signal to the OR circuit 515 when the input feedback driving voltage VDDFB is less than or equal to the maximum feedback driving voltage VDDFB_MAX. The first comparator circuit 511 may output a high signal to the OR circuit 515 when the input feedback driving voltage VDDFB is greater than or equal to the maximum feedback driving voltage VDDFB_MAX.

The second comparator circuit 513 may output a low signal to the OR circuit 515 when the input feedback driving voltage VDDFB is greater than or equal to the minimum feedback driving voltage VDDFB_MIN. The second comparator circuit 513 may output a high signal to the OR circuit 515 when the input feedback driving voltage VDDFB is less than or equal to the minimum feedback driving voltage VDDFB_MIN.

The OR circuit 515 may output a high signal to the selector circuit MUX when a high signal is received from the first comparator circuit 511 and/or the second comparator circuit 513. The OR circuit 515 may output a low signal to the selector circuit MUX when a low signal is received from both the first comparator circuit 511 and the second comparator circuit 513.

The controller 140 may output a first selection signal or a second selection signal to the selector circuit MUX.

Figure 9:
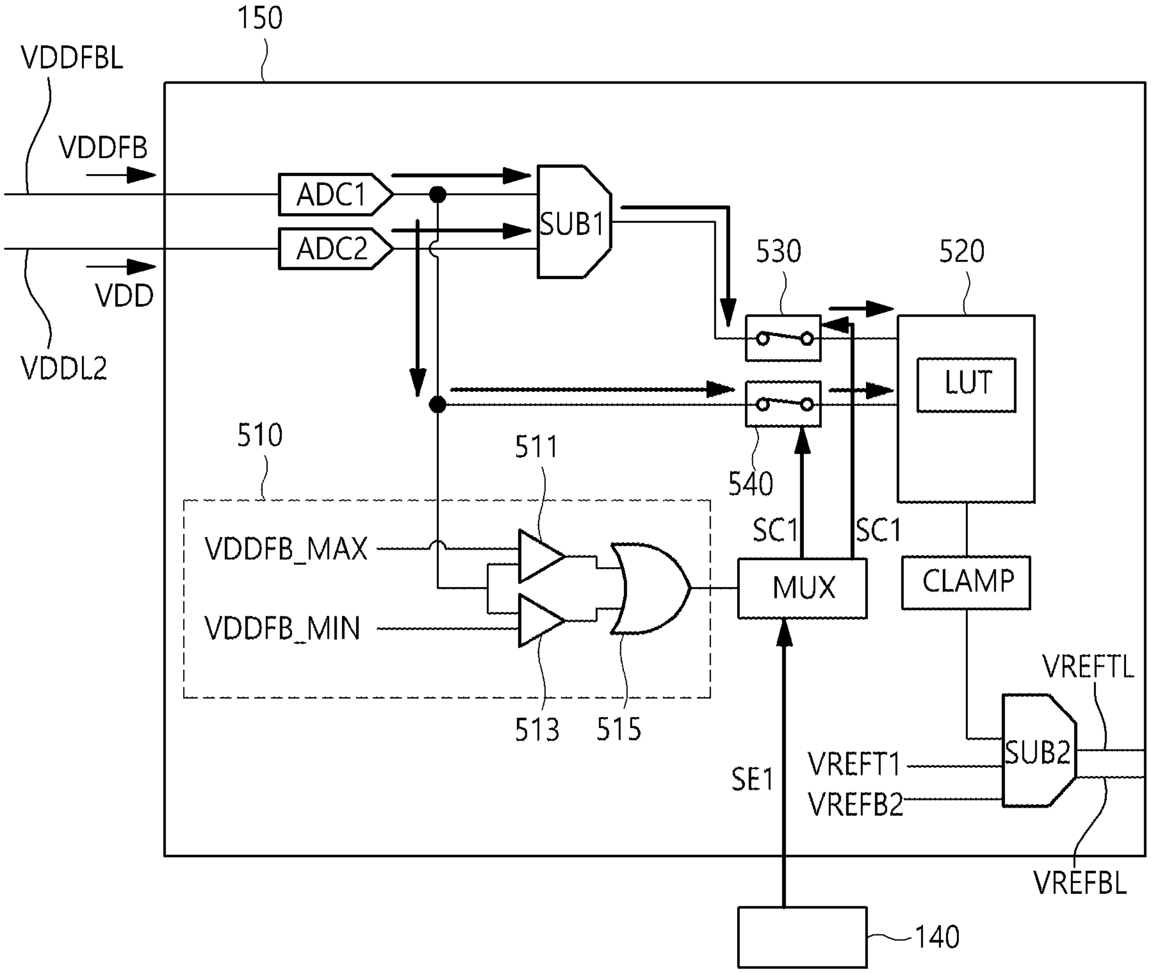
FIG. 9 is a diagram illustrating an example of a power management circuit that generates a lookup table according to embodiments of the present disclosure.
Figure 10:
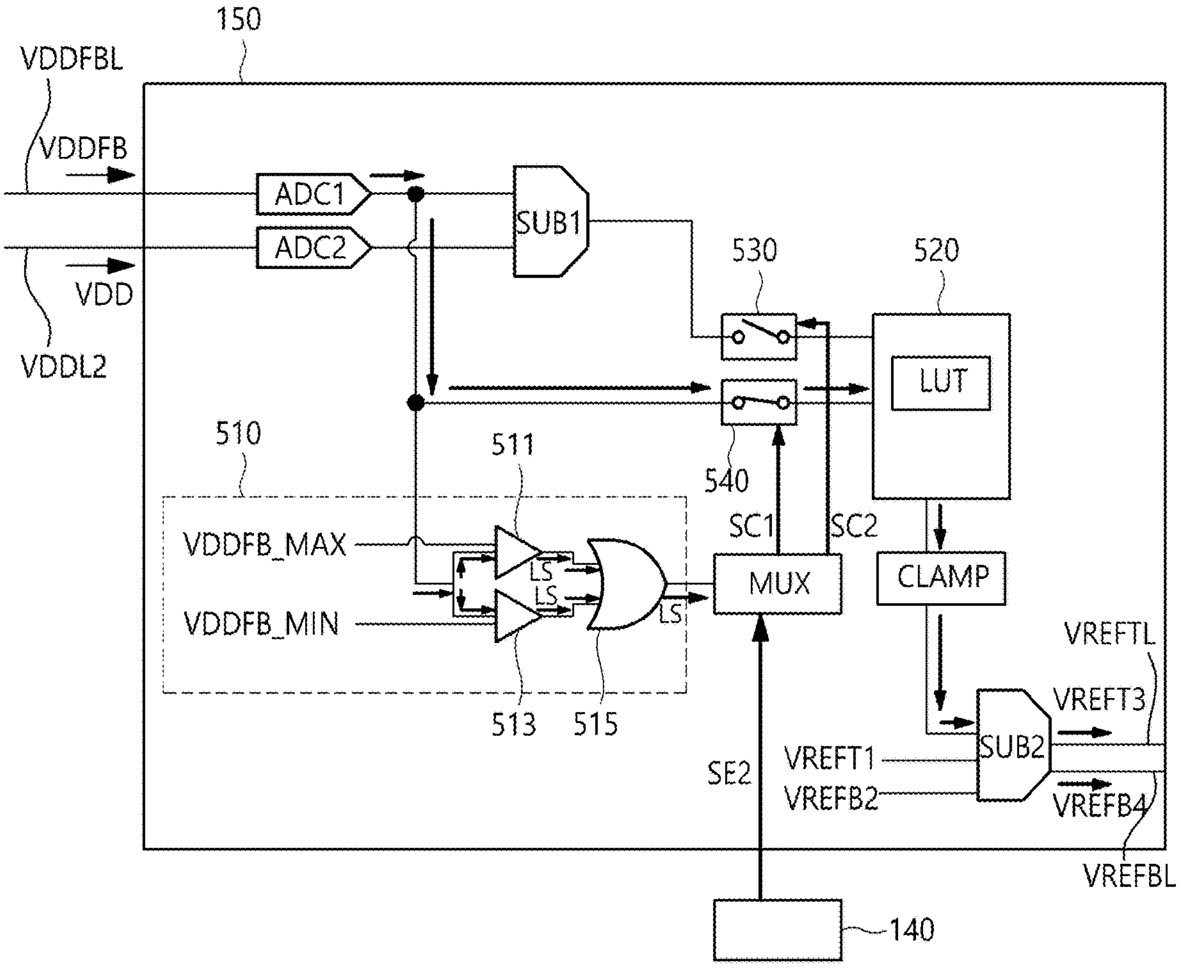
FIG. 10 is a diagram illustrating an example of a power management circuit that outputs a gamma reference voltage using a lookup table according to embodiments of the present disclosure.
Figure 11:
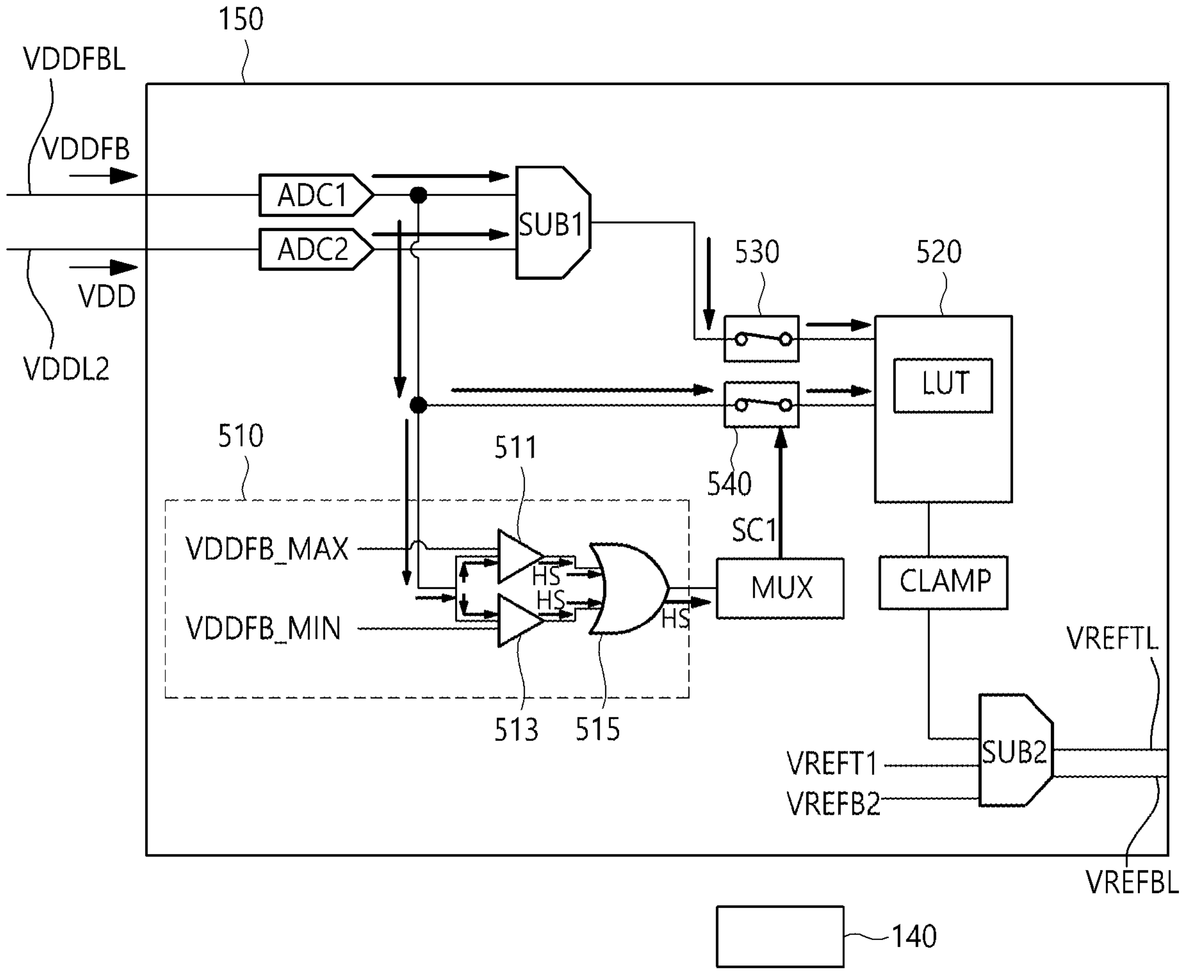
FIG. 11 is a diagram illustrating an example of a power management circuit configured to initiate modification of a lookup table in response to variation in the feedback driving voltage according to embodiments of the present disclosure.

The selector circuit MUX may be configured as a multiplexer or a demultiplexer. The selector circuit MUX may change the states of the first switch 530 and the second switch 540 to a turned-on state or a turned-off state in response to signals received from the re-addressing circuit 510 and/or the controller 140. The control operation of the first switch 530 and the second switch 540 in the selector circuit MUX is illustrated in the descriptions of FIGS. 9 to 11.

When the first switch 530 is turned on, the difference value between the driving voltage VDD and the feedback driving voltage VDDFB may be input to the register 520. When the second switch 540 is turned on, the value of the feedback driving voltage VDDFB may be input to the register 520.

The register 520 may store the difference value between the driving voltage VDD and the feedback driving voltage VDDFB, and the value of the feedback driving voltage VDDFB as data in the form of a lookup table LUT. The data related to variation in the driving voltage VDD included in the lookup table LUT is illustrated in the description of FIG. 8.

The register 520 may output a first digital value, determined based on the value of the feedback driving voltage VDDFB, to the limiter circuit CLAMP. The first value may be the difference value between the driving voltage VDD and the feedback driving voltage VDDFB. The limiter circuit CLAMP may change the input first value to a second value having a fixed value when the magnitude of the first value exceeds a threshold. When a crack or short occurs in the display panel 110, the difference between the feedback driving voltage VDDFB and the driving voltage VDD may exceed the threshold. If a difference value exceeding the threshold is reflected in the gamma reference voltage, a voltage adjustment unrelated to the driving voltage VDD or the feedback driving voltage VDDFB may occur. By changing the magnitude of the first value, the limiter circuit CLAMP may prevent the data voltage VDATA from being adjusted regardless of the driving voltage VDD.

The limiter circuit CLAMP may output the first value or the second value to the second subtractor circuit SUB2.

The second subtractor circuit SUB2 may subtract the first value or the second value from the first gamma reference voltage VREFT1 and the second gamma reference voltage VREFB2, which is lower than the first gamma reference voltage VREFT1. As a result of the subtraction, the first gamma reference voltage VREFT1 and the second gamma reference voltage VREFB2 may be changed to a third gamma reference voltage VREFT3 and a fourth gamma reference voltage VREFB4, respectively, each having a different value. Accordingly, the gamma reference voltage used to generate the data voltage VDATA may be changed.

The second subtractor circuit SUB2 may respectively output the third gamma reference voltage VREFT3 and the fourth gamma reference voltage VREFB4 to the first gamma reference voltage line VREFTL and the second gamma reference voltage line VREFBL.

Hereinafter, the lookup table LUT in the power management circuit 150 will be described.

FIG. 8 is a diagram illustrating a lookup table LUT of the display device 100 according to embodiments of the present disclosure.

Referring to FIG. 8, the lookup table LUT may include a plurality of gradation levels GRAY, the plurality of feedback driving voltages VDDFB corresponding to the plurality of gradation levels GRAY, and difference values between the driving voltage VDD and the plurality of feedback driving voltages VDDFB corresponding to the plurality of feedback driving voltages VDDFB.

While generating the lookup table LUT in the register 520, the register 520 may receive the plurality of feedback driving voltages VDDFB, the driving voltage VDD, and the difference values between the plurality of feedback driving voltages VDDFB and the driving voltage VDD.

The amount of current flowing through the display panel 110 may be proportional to the gradation level GRAY. As the amount of current flowing through the display panel 110 increases, the voltage drop of the driving voltage VDD increases. Accordingly, the gradation level GRAY and the voltage drop of the driving voltage VDD may be proportional to each other. Since the feedback driving voltage VDDFB is a value obtained by subtracting the voltage drop from the driving voltage VDD, when the voltage drop of the driving voltage VDD is small, the feedback driving voltage VDDFB may be large. Accordingly, the power management circuit 150 may store the feedback driving voltage VDDFB having the greatest value among the input plurality of feedback driving voltages VDDFB so as to correspond to a first gradation level having a minimum gradation value (e.g., gray level 0).

Since the feedback driving voltage VDDFB is a value obtained by subtracting the voltage drop from the driving voltage VDD, when the voltage drop is large, the feedback driving voltage VDDFB may be small. The power management circuit 150 may store the feedback driving voltage VDDFB having the smallest value among the input plurality of feedback driving voltages VDDFB so as to correspond to a second gradation level having a maximum gradation value (e.g., gray level 255).

The power management circuit 150 may obtain a plurality of feedback driving voltages VDDFB respectively corresponding to a plurality of gradation levels GRAY between the first gradation level and the second gradation level by interpolation. The power management circuit 150 may store the obtained plurality of feedback driving voltages VDDFB to correspond to the plurality of gradation levels GRAY.

For example, if the value of the feedback driving voltage VDDFB corresponding to gray level 0 is a digital value equivalent to 4000 mV, and the value of the feedback driving voltage VDDFB corresponding to gray level 255 is a digital value equivalent to 3745 mV, the power management circuit 150 may obtain a voltage having a digital value equivalent to 3999 mV as a feedback driving voltage VDDFB corresponding to gray level 254. The power management circuit 150 may store the obtained feedback driving voltage VDDFB having a digital value equivalent to 3999 mV so as to correspond to gray level 254.

When the driving voltage VDD has a fixed value, the difference value between the driving voltage VDD and the feedback driving voltage VDDFB may be inversely proportional to the value of the feedback driving voltage VDDFB.

The power management circuit 150 may store a first difference value, which is the smallest among the difference values between the input driving voltage VDD and the feedback driving voltage VDDFB, so as to correspond to the feedback driving voltage VDDFB having the largest value or to a first gradation level.

The power management circuit 150 may store a second difference value, which is the largest among the difference values between the input driving voltage VDD and the feedback driving voltage VDDFB, so as to correspond to the feedback driving voltage VDDFB having the smallest value or to a second gradation level.

The power management circuit 150 may obtain a plurality of difference values corresponding to a plurality of feedback driving voltages VDDFB by interpolating between the first difference value and the second difference value. For example, when the first difference value corresponding to the largest feedback driving voltage VDDFB is 0, and the second difference value corresponding to the smallest feedback driving voltage VDDFB is 255, the difference value corresponding to gray level 254, or the difference value corresponding to the feedback driving voltage VDDFB associated with gray level 254, may have a value of 254.

The register 520 may output a voltage having a difference value between the driving voltage VDD and the feedback driving voltage VDDFB using the data stored in the lookup table LUT. For example, the register 520 may store data in the lookup table LUT including gray level 255, a feedback driving voltage VDDFB corresponding to gray level 255 having a digital value equivalent to 4000 mV, and a difference value of 255 corresponding to the feedback driving voltage VDDFB having the digital value of 4000 mV. When a feedback driving voltage VDDFB having a digital value equivalent to 4000 mV is input from the outside, the register 520 may output a difference value corresponding to the value of 255.

However, this is merely an example and is not limited to generating the lookup table LUT based on only two sensed values (the driving voltage VDD and the feedback driving voltage VDDFB).

For example, the power management circuit 150 may generate (or store or update) values of the driving voltage VDD and the feedback driving voltage VDDFB for all gradation levels in the lookup table (LUT), based on results obtained by acquiring the driving voltage VDD and the feedback driving voltage VDDFB for at least three gradation conditions.

The power management circuit 150 may be operated in a first mode (FIG. 9) for storing values of the driving voltage VDD and the feedback driving voltage VDDFB per gradation level in the lookup table LUT, a second mode (FIG. 10) for adjusting and outputting a plurality of gamma reference voltages VREFT1, VREFB2, VREFT3, and VREFB4 based on the actual values of the driving voltage VDD and the feedback driving voltage VDDFB during display driving, and a third mode (FIG. 11) for updating the lookup table LUT.

FIG. 8 illustrates an example of generating or updating the LUT.

FIG. 9 is a diagram illustrating an example of the power management circuit 150 for generating a lookup table LUT according to embodiments of the present disclosure.

Referring to FIG. 9, the power management circuit 150 may be operated in the first mode. For example, the first mode may be performed during initial startup of the display device or before the product is shipped.

The first analog-to-digital converter ADC1 and the second analog-to-digital converter ADC2 may each convert the values of the feedback driving voltage VDDFB and the driving voltage VDD provided to them into digital form.

The first analog-to-digital converter ADC1 may output the digitally converted feedback driving voltage VDDFB to the first subtractor circuit SUB1 and the second switch 540. The second analog-to-digital converter ADC2 may output the digitally converted driving voltage VDD to the first subtractor circuit SUB1.

The first subtractor circuit SUB1 may calculate the difference value between the driving voltage VDD and the feedback driving voltage VDDFB and output it to the first switch 530.

The selector circuit MUX may receive a first selection signal SE1 from the controller 140. The first selection signal SE1 may be a control signal for turning on the first switch 530 and the second switch 540 via the selector circuit MUX. The selector circuit MUX may apply a first control signal SC1 to the first switch 530 and the second switch 540 in response to the first selection signal SE1.

The first switch 530 and the second switch 540 may be turned on in response to the first control signal SC1. Accordingly, the difference value between the driving voltage VDD and the feedback driving voltage VDDFB, and the value of the feedback driving voltage VDDFB, may be provided to the register 520.

While the first selection signal SE1 is input to the selector circuit MUX, the register 520 may obtain or store data included in the lookup table LUT based on the plurality of input feedback driving voltages VDDFB and the difference values between the driving voltage VDD and the feedback driving voltage VDDFB. For example, in the first mode, values of the driving voltage VDD and the feedback driving voltage VDDFB per gradation level may be stored. Since the operation of obtaining or storing the data included in the lookup table LUT is illustrated in the description of FIG. 8, redundant explanation is omitted.

FIG. 10 is a diagram illustrating an example of the power management circuit 150 for outputting the gamma reference voltage using the lookup table LUT according to embodiments of the present disclosure.

Referring to FIG. 10, the power management circuit 150 may be operated in the second mode. For example, the second mode may be performed in real time during use of the display device, and the output of the gamma reference voltage may be adjusted based on the sensed feedback driving voltage VDDFB.

The feedback driving voltage VDDFB may be input to the first analog-to-digital converter ADC1 through the feedback driving voltage line VDDFBL.

The first analog-to-digital converter ADC1 may convert the value of the feedback driving voltage VDDFB into a digital form.

The first analog-to-digital converter ADC1 may output the digitally converted value of the feedback driving voltage VDDFB to the second switch 540 and the re-addressing circuit 510.

The value of the feedback driving voltage VDDFB input to the re-addressing circuit 510 may be input to the first comparator circuit 511 and the second comparator circuit 513 included in the re-addressing circuit 510.

Referring to FIG. 10, as the feedback driving voltage VDDFB is lower than the maximum feedback driving voltage VDDFB_MAX, a low signal LS may be output to the OR circuit 515. As the input feedback driving voltage VDDFB is higher than the minimum feedback driving voltage VDDFB_MIN, the second comparator circuit 513 may output a low signal LS to the OR circuit 515. When the OR circuit 515 receives the low signals LS, it may output a low signal LS to the selector circuit MUX.

The selector circuit MUX may receive the low signal LS from the OR circuit 515. Upon receiving the low signal LS, the selector circuit MUX may continue receiving a second selection signal SE2 from the controller 140. While receiving the second selection signal SE2, the selector circuit MUX may output a second control signal SC2 to the first switch 530 and a first control signal SC1 to the second switch 540.

The first switch 530 may be in a turned-off state while receiving the second control signal SC2. That is, the second control signal SC2 may be a signal for turning off the switch. The second switch 540 may be in a turned-on state while receiving the first control signal SC1. As the second switch 540 is turned on, the register 520 may receive the value of the feedback driving voltage VDDFB. In other words, when the feedback driving voltage VDDFB is between the maximum feedback driving voltage VDDFB_MAX and the minimum feedback driving voltage VDDFB_MIN, the second switch 540 may be turned on.

While the first selection signal SE1 is applied to the selector circuit MUX, the register 520 may output a first value having a digital value corresponding to the difference between the driving voltage VDD and the feedback driving voltage VDDFB to the limiter circuit CLAMP, using the input feedback driving voltage VDDFB and the values stored in the lookup table LUT. Since the operation of the register 520 outputting the difference value between the driving voltage VDD and the feedback driving voltage VDDFB using the data included in the LUT is illustrated in the description of FIG. 8, redundant explanation is omitted.

The limiter circuit CLAMP may change the first value having a digital value corresponding to the difference between the driving voltage VDD and the feedback driving voltage VDDFB to a second value having a fixed value, when the first value exceeds a threshold voltage, and may output the second value to the second subtractor circuit SUB2.

The second subtractor circuit SUB2 may subtract the first value or the second value from the first gamma reference voltage VREFT1 and the second gamma reference voltage VREFB2, respectively, and may accordingly change the first gamma reference voltage VREFT1 and the second gamma reference voltage VREFB2 to a third gamma reference voltage VREFT3 and a fourth gamma reference voltage VREFB4, respectively.

The first gamma reference voltage VREFT1, the second gamma reference voltage VREFB2, the third gamma reference voltage VREFT3, and the fourth gamma reference voltage VREFB4 may have digital values.

The changed third gamma reference voltage VREFT3 and fourth gamma reference voltage VREFB4 may be respectively output to the first gamma reference voltage line VREFTL and the second gamma reference voltage line VREFBL.

The output third gamma reference voltage VREFT3 and fourth gamma reference voltage VREFB4 may be input to the gamma voltage generation circuit 170 through the first gamma reference voltage line VREFTL and the second gamma reference voltage line VREFBL, respectively.

FIG. 11 is a diagram illustrating an example of the power management circuit 150 configured to initiate updating of the lookup table LUT when variation in the feedback driving voltage VDDFB occurs according to an embodiment of the present disclosure.

Referring to FIG. 11, the power management circuit 150 may operate in a third mode. For example, the third mode may be performed during use of the display device to update the values stored in the lookup table LUT. The feedback driving voltage VDDFB may be input to the first analog-to-digital converter ADC1 through the feedback driving voltage line VDDFBL. The driving voltage VDD may be input to the second analog-to-digital converter ADC2 through the second driving voltage line VDDL2.

The first analog-to-digital converter ADC1 and the second analog-to-digital converter ADC2 may each convert the value of the feedback driving voltage VDDFB and the driving voltage VDD into a digital form.

The first analog-to-digital converter ADC1 may output the digitally converted value of the feedback driving voltage VDDFB to the first subtractor circuit SUB1, the second switch 540, and the re-addressing circuit 510. The second analog-to-digital converter ADC2 may output the digitally converted value of the driving voltage VDD to the first subtractor circuit SUB1.

The first subtractor circuit SUB1 may calculate the difference value between the driving voltage VDD and the feedback driving voltage VDDFB and may output the result to the first switch 530.

The value of the feedback driving voltage VDDFB input to the re-addressing circuit 510 may be input to the first comparator circuit 511 and the second comparator circuit 513 included in the re-addressing circuit 510.

Referring to FIG. 11, as the feedback driving voltage VDDFB becomes higher than the maximum feedback driving voltage VDDFB_MAX, the first comparator circuit 511 may output a high signal HS to the OR circuit 515. As the input feedback driving voltage VDDFB becomes lower than the minimum feedback driving voltage VDDFB_MIN, the second comparator circuit 513 may output a high signal HS to the OR circuit 515. When the OR circuit 515 receives the high signal HS from either the first comparator circuit 511 or the second comparator circuit 513, it may output a high signal HS to the selector circuit MUX.

The selector circuit MUX may receive the high signal HS from the OR circuit 515. Upon receiving the high signal HS, the selector circuit MUX may stop receiving the second selection signal SE2 from the controller 140. While receiving the high signal HS, the selector circuit MUX may apply the first control signal SC1 to the first switch 530 and the second switch 540.

The first switch 530 and the second switch 540 may be in a turned-on state while receiving the first control signal SC1. As the first switch 530 and the second switch 540 are turned on, the register 520 may receive a difference value between the driving voltage VDD and the feedback driving voltage VDDFB, and a value of the feedback driving voltage VDDFB.

While the selector circuit MUX receives the high signal HS, the register 520 may acquire or store data included in the lookup table LUT based on the plurality of feedback driving voltages VDDFB input to the register 520 and the difference values between the driving voltage VDD and the feedback driving voltage VDDFB. Since the operation of acquiring or storing data included in the lookup table LUT is illustrated in the description of FIG. 8, redundant descriptions are omitted.

Accordingly, when the feedback driving voltage VDDFB deviates from the range between the maximum feedback driving voltage VDDFB_MAX and the minimum feedback driving voltage VDDFB_MIN, the lookup table LUT may be updated. The gamma reference voltage may be generated based on the updated lookup table LUT. The display device 100 may generate a data voltage VDATA according to the generated gamma reference voltage. For example, the value of the feedback driving voltage VDDFB or the value of the driving voltage VDD may deviate from a predetermined range at the time of power-on or power-off of the display device 100. While the value of the feedback driving voltage VDDFB or the value of the driving voltage VDD deviates from the predetermined range, the display device 100 may update the lookup table LUT. The display device 100 may generate the gamma reference voltage according to the updated lookup table LUT. The display device 100 may use the data voltage VDATA corresponding to the generated gamma reference voltage to prevent the generation of noise in the image. As the noise generation is prevented, the occurrence of residual horizontal lines in the image may be reduced.

Hereinafter, the improved effects of the display device 100 according to various embodiments of the present disclosure will be described.

Figure 12:
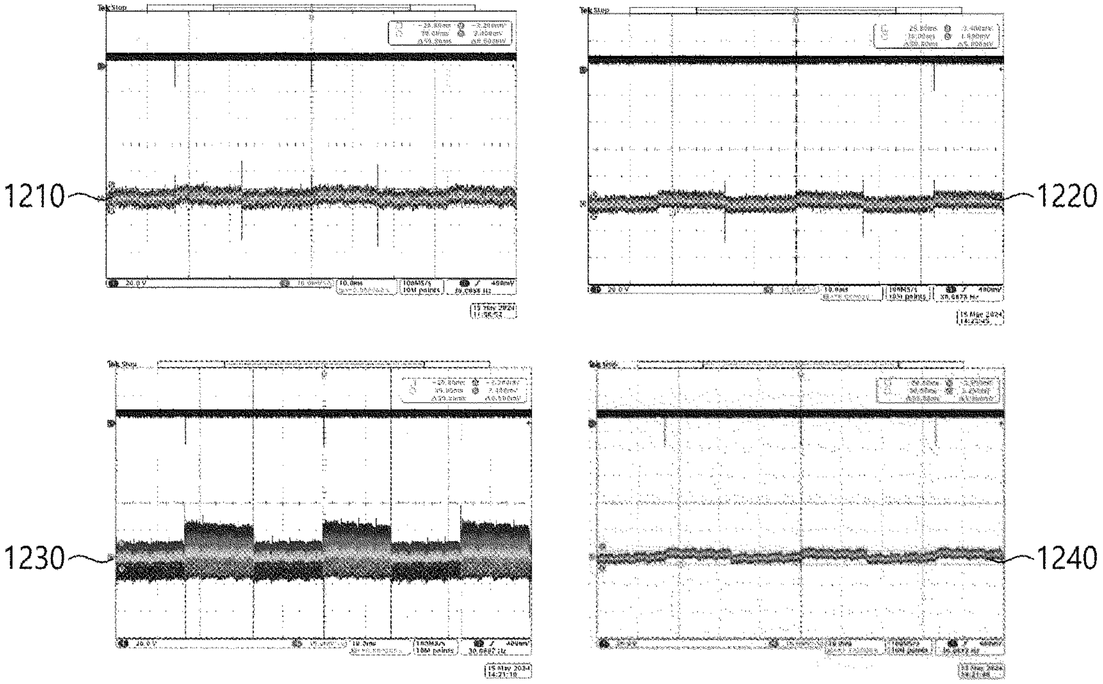
FIG. 12 is a waveform diagram of a feedback driving voltage and a gamma reference voltage in a display device according to embodiments of the present disclosure.

FIG. 12 is a waveform diagram of the feedback driving voltage VDDFB and the gamma reference voltage of the display device 100 according to an embodiment of the present disclosure.

Noise in the display panel 110 may cause an issue of generating residual horizontal lines in the image. The noise may be proportional to the amplitude of the waveform of the feedback driving voltage VDDFB and the amplitude of the waveform of the gamma reference voltage.

Referring to FIG. 12, a first gamma reference voltage waveform 1210 may refer to the waveform of the gamma reference voltage before being adjusted using the lookup table LUT. A second gamma reference voltage waveform 1220 may refer to the waveform of the gamma reference voltage after being adjusted using the lookup table LUT.

The amplitude of the first gamma reference voltage waveform 1210 is greater than that of the second gamma reference voltage waveform 1220. In addition, the amplitude of the largest peak in the first gamma reference voltage waveform 1210 is greater than that of the largest peak in the second gamma reference voltage waveform 1220. Accordingly, during the adjustment of the gamma reference voltage using the lookup table LUT, the occurrence frequency of the noise phenomenon in the display device 100 may be reduced. As the occurrence frequency of the noise phenomenon is reduced, the number of residual horizontal lines displayed in the image may also decrease.

Referring to FIG. 12, a first feedback driving voltage waveform 1230 may refer to the waveform of the feedback driving voltage VDDFB before adjusting the gamma reference voltage using the lookup table LUT. A second feedback driving voltage waveform 1240 may refer to the waveform of the feedback driving voltage VDDFB after adjusting the gamma reference voltage using the lookup table LUT.

The amplitude of the first feedback driving voltage waveform 1230 is greater than that of the second feedback driving voltage waveform 1240. Accordingly, during the adjustment of the gamma reference voltage using the lookup table LUT, the occurrence frequency of the noise phenomenon in the display device 100 may be reduced. As the occurrence frequency of the noise phenomenon is reduced, the number of residual horizontal lines in the displayed image may also decrease.

The embodiments of the present disclosure described above will now be briefly summarized as follows.

The display device may include: a display panel in which a plurality of sub-pixels are disposed; a data driver circuit that applies a plurality of data voltages to the plurality of sub-pixels through a plurality of data lines; a driving voltage supply circuit that supplies a driving voltage to the display panel; and a power management circuit that receives a feedback driving voltage from the display panel, receives the driving voltage output from the driving voltage supply circuit, and outputs the gamma reference voltage to the data driver circuit.

The power management circuit may include a register that stores data related to variation in the driving voltage.

The gamma reference voltage may be variable according to the feedback driving voltage.

The display device may further include a feedback driving voltage line connected between the display panel and the power management circuit, and a driving voltage line connected between the driving voltage supply circuit and the power management circuit.

The power management circuit may further include: a first analog-to-digital converter connected between the feedback driving voltage line and the register and converting the feedback driving voltage into a digital form; a second analog-to-digital converter connected between the driving voltage line and the register and converting the driving voltage into a digital form; and a first subtractor circuit that calculates a difference value between an output of the first analog-to-digital converter and an output of the second analog-to-digital converter and provides the difference value to the register.

The power management circuit may further include: a first switch connected between the first subtractor circuit and the register; a second switch connected between the first analog-to-digital converter and the register; and a selector circuit that controls the first switch and the second switch.

While the first switch is turned on, the difference value may be input from the first subtractor circuit to the register.

While the second switch is turned on, a value of the feedback driving voltage may be input from the first analog-to-digital converter to the register.

The display device may further include a controller that controls the power management circuit and the driving voltage supply circuit and outputs a first selection signal or a second selection signal to the selector circuit.

The selector circuit may turn on the first switch and the second switch in response to the first selection signal.

The selector circuit may turn off the first switch and turn on the second switch in response to the second selection signal.

The power management circuit may further include a re-addressing circuit.

The re-addressing circuit may control the selector circuit based on a comparison result between the feedback driving voltage and a preset voltage range.

The re-addressing circuit may further include a first comparator circuit and a second comparator circuit.

The first comparator circuit may compare a value of the feedback driving voltage input from the feedback driving voltage line with a maximum feedback driving voltage value.

The second comparator circuit may compare the value of the feedback driving voltage input from the feedback driving voltage line with a minimum feedback driving voltage value.

The re-addressing circuit may further include an OR circuit.

When the value of the feedback driving voltage is greater than or equal to the maximum feedback driving voltage value, the first comparator circuit may apply a first signal to the OR circuit.

When the value of the feedback driving voltage is less than or equal to the maximum feedback driving voltage value, the first comparator circuit may apply a second signal to the OR circuit.

When the value of the feedback driving voltage is less than or equal to the minimum feedback driving voltage value, the second comparator circuit may apply the first signal to the OR circuit.

When the value of the feedback driving voltage is greater than or equal to the minimum feedback driving voltage value, the second comparator circuit may apply the second signal to the OR circuit.

When the first signal is applied from either the first comparator circuit or the second comparator circuit, the OR circuit may apply the first signal to the selector circuit.

When the second signal is applied from both the first comparator circuit and the second comparator circuit, the OR circuit may apply the second signal to the selector circuit.

The selector circuit may turn on the first switch and the second switch in response to the first signal.

As the first switch and the second switch are turned on, a difference value between the driving voltage and the feedback driving voltage and a value of the feedback driving voltage may be input to the register.

A value of the feedback driving voltage may be input from the first analog-to-digital converter to the register.

The register may output a difference value between the driving voltage and the feedback driving voltage based on the input value of the feedback driving voltage.

The power management circuit may include a second subtractor circuit that subtracts the difference value from the gamma reference voltage, and the gamma reference voltage line that outputs the gamma reference voltage.

The second subtractor circuit may output to the gamma reference voltage line a voltage having a value obtained by subtracting the difference value from the gamma reference voltage.

The gamma reference voltage line may include a first gamma reference voltage line that outputs a first gamma reference voltage and a second gamma reference voltage line that outputs a second gamma reference voltage lower than the first gamma reference voltage.

The second subtractor circuit may change the first gamma reference voltage and the second gamma reference voltage to a third gamma reference voltage and a fourth gamma reference voltage, respectively, based on the difference value.

The second subtractor circuit may output the third gamma reference voltage to the first gamma reference voltage line.

The second subtractor circuit may output the fourth gamma reference voltage to the second gamma reference voltage line.

The power management circuit may further include a limiter circuit connected between the register and the second subtractor circuit and configured to limit a magnitude of the difference value.

A display device may include a display panel in which a plurality of sub-pixels are disposed, a data driver circuit that applies a plurality of data voltages to the plurality of sub-pixels through a plurality of data lines, a driving voltage supply circuit that supplies a driving voltage to the display panel, and a power management circuit that receives a plurality of feedback driving voltages from the display panel and receives the driving voltage output from the driving voltage supply circuit.

The power management circuit may include a register that stores data variable according to the plurality of feedback driving voltages and the driving voltage.

The power management circuit may store the data in the register in the form of a lookup table.

The lookup table may include a plurality of gradation levels, a plurality of feedback driving voltages corresponding to the plurality of gradation levels, and difference values between the driving voltage and the plurality of feedback driving voltages corresponding to the plurality of feedback driving voltages.

The power management circuit may input, to the register, a first feedback driving voltage having the greatest value among the plurality of feedback driving voltages, a second feedback driving voltage having the smallest value among the plurality of feedback driving voltages, and the driving voltage, and may store the first feedback driving voltage input to the register to correspond to a first gradation level having the smallest value among the plurality of gradation levels.

The power management circuit may store the second feedback driving voltage input to the register to correspond to a second gradation level having the greatest value among the plurality of gradation levels.

The power management circuit may obtain a first difference value corresponding to the first feedback driving voltage by subtracting the first feedback driving voltage from the input driving voltage.

The power management circuit may obtain a second difference value corresponding to the second feedback driving voltage by subtracting the second feedback driving voltage from the input driving voltage.

The register may store the obtained first difference value to correspond to the first feedback driving voltage and may store the obtained second difference value to correspond to the second feedback driving voltage.

The power management circuit may obtain a plurality of feedback driving voltages respectively corresponding to a plurality of gradation levels between the first gradation level and the second gradation level based on the first feedback driving voltage and the second feedback driving voltage.

The power management circuit may store the obtained plurality of feedback driving voltages in the register to correspond to the plurality of gradation levels.

The power management circuit may obtain difference values respectively corresponding to the plurality of feedback driving voltages between the first feedback driving voltage and the second feedback driving voltage based on the first difference value and the second difference value.

The power management circuit may store the obtained difference values in the register to correspond to the plurality of feedback driving voltages.

The above description has been presented to enable any person skilled in the art to make and use the technical idea of the present disclosure, and has been provided in the context of a particular application and its requirements. Various modifications, additions, and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a display panel in which a plurality of sub-pixels are disposed;

a data driver circuit configured to apply a plurality of data voltages to the plurality of sub-pixels through a plurality of data lines;

a driving voltage supply circuit configured to apply a driving voltage to the display panel; and a power management circuit connected to receive a feedback driving voltage from the display panel, receive the driving voltage output from the driving voltage supply circuit, and configured to output a gamma reference voltage to the data driver circuit, a feedback driving voltage line connected between the display panel and the power management circuit; and a driving voltage line connected between the driving voltage supply circuit and the power management circuit;

wherein the power management circuit comprises:

a register configured to store data related to a variation in the driving voltage;

a first analog-to-digital converter connected between the feedback driving voltage line and the register and converting the feedback driving voltage into a digital form;

a second analog-to-digital converter connected between the driving voltage line and the register and converting the driving voltage into a digital form; and a first subtractor circuit configured to calculate a difference value between an output of the first analog-to-digital converter and an output of the second analog-to-digital converter and provide the difference value to the register; and wherein the gamma reference voltage is variable based on the feedback driving voltage.

2. The display device according to claim 1, wherein the power management circuit further comprises:

a first switch connected between the first subtractor circuit and the register;

a second switch connected between the first analog-to-digital converter and the register; and a selector circuit configured to control the first switch and the second switch, wherein, while the first switch is turned on, the difference value is sent from the first subtractor circuit to the register, and wherein, while the second switch is turned on, a value of the feedback driving voltage is sent from the first analog-to-digital converter to the register.

3. The display device according to claim 2, further comprising a controller configured to control the power management circuit and the driving voltage supply circuit and output a first selection signal or a second selection signal to the selector circuit, wherein the selector circuit turns on the first switch and the second switch in response to the first selection signal, and wherein the selector circuit turns off the first switch and turns on the second switch in response to the second selection signal.

4. The display device according to claim 2, wherein the power management circuit further comprises a re-addressing circuit, and wherein the re-addressing circuit is configured to control the selector circuit based on a comparison result between the feedback driving voltage and a preset voltage range.

5. The display device according to claim 4, wherein the re-addressing circuit further comprises a first comparator circuit and a second comparator circuit, wherein the first comparator circuit is configured to compare a value of the feedback driving voltage input from the feedback driving voltage line with a maximum feedback driving voltage value, and wherein the second comparator circuit is configured to compare the value of the feedback driving voltage input from the feedback driving voltage line with a minimum feedback driving voltage value.

6. The display device according to claim 5, wherein the re-addressing circuit further comprises an OR circuit, wherein, when the value of the feedback driving voltage is greater than or equal to the maximum feedback driving voltage value, the first comparator circuit applies a first signal to the OR circuit, wherein, when the value of the feedback driving voltage is less than or equal to the maximum feedback driving voltage value, the first comparator circuit applies a second signal to the OR circuit, wherein, when the value of the feedback driving voltage is less than or equal to the minimum feedback driving voltage value, the second comparator circuit applies the first signal to the OR circuit, wherein, when the value of the feedback driving voltage is greater than or equal to the minimum feedback driving voltage value, the second comparator circuit applies the second signal to the OR circuit, wherein the OR circuit applies the first signal to the selector circuit when the first signal is applied from either the first comparator circuit or the second comparator circuit, and wherein the OR circuit applies the second signal to the selector circuit when the second signal is applied from both the first comparator circuit and the second comparator circuit.

7. The display device according to claim 6, wherein the selector circuit is configured to turn on the first switch and the second switch in response to the first signal, and wherein, as the first switch and the second switch are turned on, a difference value between the driving voltage and the feedback driving voltage and a value of the feedback driving voltage are input to the register.

8. The display device according to claim 1, wherein in operation a value of the feedback driving voltage is input from the first analog-to-digital converter to the register, and wherein the register outputs a difference value between the driving voltage and the feedback driving voltage according to the input value of the feedback driving voltage.

9. The display device according to claim 8, wherein the power management circuit comprises:

a second subtractor circuit configured to subtract the difference value from the gamma reference voltage; and a gamma reference voltage line configured to output the gamma reference voltage, and wherein the second subtractor circuit is configured to output to the gamma reference voltage line a voltage having a value obtained by subtracting the difference value from the gamma reference voltage.

10. The display device according to claim 9, wherein the gamma reference voltage line comprises a first gamma reference voltage line configured to output a first gamma reference voltage and a second gamma reference voltage line configured to output a second gamma reference voltage lower than the first gamma reference voltage, wherein the second subtractor circuit is configured to change the first gamma reference voltage and the second gamma reference voltage to a third gamma reference voltage and a fourth gamma reference voltage, respectively, according to the difference value, wherein in operation the third gamma reference voltage is output to the first gamma reference voltage line, and wherein in operation the fourth gamma reference voltage is output to the second gamma reference voltage line.

11. The display device according to claim 9, wherein the power management circuit further comprises a limiter circuit connected between the register and the second subtractor circuit and configured to limit a magnitude of the difference value.

12. A display device comprising:

a display panel in which a plurality of sub-pixels are disposed;

a data driver circuit configured to apply a plurality of data voltages to the plurality of sub-pixels through a plurality of data lines;

a driving voltage supply circuit configured to supply a driving voltage to the display panel; and a power management circuit connected to receive a plurality of feedback driving voltages from the display panel and receive the driving voltage output from the driving voltage supply circuit, a feedback driving voltage line connected between the display panel and the power management circuit; and a driving voltage line connected between the driving voltage supply circuit and the power management circuit, and wherein the power management circuit comprises:

a register configured to store data variable according to the plurality of feedback driving voltages and the driving voltage;

a first analog-to-digital converter connected between the feedback driving voltage line and the register and converting the feedback driving voltage into a digital form;

a second analog-to-digital converter connected between the driving voltage line and the register and converting the driving voltage into a digital form; and a first subtractor circuit configured to calculate a difference value between an output of the first analog-to-digital converter and an output of the second analog-to-digital converter and provide the difference value to the register.

13. The display device according to claim 12, wherein the power management circuit is configured to store the data in the register in a form of a lookup table, wherein the lookup table includes a plurality of gradation levels, a plurality of feedback driving voltages corresponding to the plurality of gradation levels, and difference values between the driving voltage and the plurality of feedback driving voltages corresponding to the plurality of feedback driving voltages.

14. The display device according to claim 13, wherein the power management circuit is configured to:

input, to the register, a first feedback driving voltage having the greatest value among the plurality of feedback driving voltages, a second feedback driving voltage having the smallest value among the plurality of feedback driving voltages, and the driving voltage;

store the first feedback driving voltage input to the register to correspond to a first gradation level having the smallest value among the plurality of gradation levels;

store the second feedback driving voltage input to the register to correspond to a second gradation level having the greatest value among the plurality of gradation levels;

obtain a first difference value corresponding to the first feedback driving voltage by subtracting the first feedback driving voltage from the input driving voltage; and obtain a second difference value corresponding to the second feedback driving voltage by subtracting the second feedback driving voltage from the input driving voltage; and wherein the register is configured to store the obtained first difference value to correspond to the first feedback driving voltage, and store the obtained second difference value to correspond to the second feedback driving voltage.

15. The display device according to claim 14, wherein the power management circuit is configured to:

obtain, based on the first feedback driving voltage and the second feedback driving voltage, a plurality of feedback driving voltages respectively corresponding to a plurality of gradation levels between the first gradation level and the second gradation level;

store the obtained plurality of feedback driving voltages in the register to correspond to the plurality of gradation levels;

obtain, based on the first difference value and the second difference value, difference values respectively corresponding to the plurality of feedback driving voltages between the first feedback driving voltage and the second feedback driving voltage; and store the obtained difference values in the register to correspond to the plurality of feedback driving voltages.

* * * * *